(12) United States Patent
Murphy

(10) Patent No.: US 8,109,467 B2
(45) Date of Patent: Feb. 7, 2012

(54) THRUST REVERSER ASSEMBLY WITH SHAPED DRAG LINKS

(75) Inventor: Michael Joseph Murphy, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 470 days.

(21) Appl. No.: 12/429,739

(22) Filed: Apr. 24, 2009

(65) Prior Publication Data

US 2010/0270428 A1 Oct. 28, 2010

(51) Int. Cl.
*F02K 1/54* (2006.01)

(52) U.S. Cl. .................................. 244/110 B

(58) Field of Classification Search ............ 244/110 B; 60/226.2
See application file for complete search history.

(56) References Cited

U.S. PATENT DOCUMENTS

| | | | |
|---|---|---|---|
| 4,278,220 A | 7/1981 | Johnston et al. | |
| 4,373,328 A | 2/1983 | Jones | |
| 4,382,551 A | 5/1983 | Thayer | |
| 4,564,160 A * | 1/1986 | Vermilye | 244/110 B |
| 4,760,960 A | 8/1988 | Ward et al. | |
| 4,807,434 A * | 2/1989 | Jurich | 60/226.2 |
| 4,909,442 A | 3/1990 | Fernz | |
| 5,228,641 A * | 7/1993 | Remlaoui | 244/110 B |
| 5,313,788 A * | 5/1994 | Wright et al. | 60/226.2 |
| 5,350,136 A | 9/1994 | Prosser et al. | |
| 5,575,147 A * | 11/1996 | Nikkanen | 60/226.2 |
| 5,655,360 A * | 8/1997 | Butler | 60/226.2 |
| 5,915,651 A * | 6/1999 | Asaki et al. | 244/110 B |
| 6,170,254 B1 * | 1/2001 | Cariola | 60/226.2 |
| 6,256,980 B1 * | 7/2001 | Lecordix et al. | 60/226.2 |
| 6,385,964 B2 * | 5/2002 | Jean et al. | 60/226.2 |
| 6,554,224 B2 * | 4/2003 | Sternberger | 244/110 B |
| 6,568,172 B2 | 5/2003 | Jannetta et al. | |
| 6,845,946 B2 | 1/2005 | Lair | |
| 6,895,742 B2 | 5/2005 | Lair et al. | |
| 7,124,981 B2 * | 10/2006 | Parham | 244/110 B |
| 7,484,356 B1 * | 2/2009 | Lair | 60/226.2 |
| 7,559,507 B2 * | 7/2009 | Harrison et al. | 244/110 B |
| 7,874,142 B2 * | 1/2011 | Beardsley | 60/226.2 |
| 7,966,808 B2 * | 6/2011 | Tsou et al. | 60/226.2 |
| 2002/0007625 A1 * | 1/2002 | Fournier et al. | 60/226.2 |
| 2004/0195434 A1 * | 10/2004 | Parham | 244/11 |
| 2006/0288688 A1 * | 12/2006 | Lair | 60/226.2 |
| 2007/0234707 A1 | 10/2007 | Beardsley | |

* cited by examiner

*Primary Examiner* — Richard Price, Jr.

(74) *Attorney, Agent, or Firm* — Kinney & Lange, P.A.

(57) ABSTRACT

A thrust reverser blocker door assembly for use in turbofan engines includes an engine nacelle with an aft translating cowl that is movable from a stowed position to a deployed position. An engine case is disposed within the engine nacelle forming an airflow duct therebetween. A gap is uncovered when the translating cowl is moved into the deployed position, and a cascade vane set is positioned in the gap. A blocker door covers the cascade vane set while in the stowed position and blocks a portion of the airflow duct while in the deployed position. A geometrically shaped drag link is pivotally connected to the engine case at a first end and connected to the blocker door at a second end. While in the deployed position, the shape of the drag link provides clearance from the engine case.

20 Claims, 4 Drawing Sheets ized cowl 13 which includes nacelle body 14 and translating cowl 16 and engine core 18. Duct 20 is formed between nacelle body 14 and core 18 for fan air flow. Translating cowl 16 is split from nacelle body 14 and translates rearwardly to produce reverse thrust.

THRUST REVERSER ASSEMBLY WITH SHAPED DRAG LINKS

BACKGROUND

This invention relates to cascade type thrust reversers for aircraft turbofan engines and, more particularly, to blocker door assemblies used in cascade type thrust reversers.

Modern aircraft turbofan engines have a nacelle or shroud surrounding the engine, spaced outwardly from a core engine cowl to define an annular passage or duct for flow of air rearwardly from the outer portion of a large fan or axial flow compressor. In this type of engine, a large proportion of the total thrust is developed by the reaction to the air driven rearward by the fan. The balance of the thrust results from ejection of the exhaust gas stream from the core engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed.

With turbofan engines, it is possible to block and reverse substantially all of the fan flow without excessive stress on the system, since the core flow continues through the engine. In some cases, sufficient reverse flow can be obtained by blocking only a substantial portion of the fan flow. The most common type of thrust reverser used in turbofan engines utilizes sets of cascade vanes in the sidewalls of the engine nacelle with devices for uncovering the cascades to direct the airflow though the cascades, which turn the airflow in a reverse direction.

As turbofan engines become increasingly more complex and efficient, the higher their bypass ratios get. A higher bypass ratio in a turbofan engine leads to better fuel burn because the fan is more efficient at producing thrust than the core engine. As a consequence, the fan gets bigger, and the annular airflow duct between the nacelle and the core engine cowl gets taller. The introduction of a fan drive gear system for turbofan engines has also led to smaller engine cores. Smaller engine cores lead to shorter fan ducts, which are desirable so the heavy components of the engine are not hung out too far in front of the wings of the aircraft. As such, engine sub-systems are required to be packaged within smaller spaces.

SUMMARY

The present invention is a thrust reverser blocker door assembly that includes an engine nacelle with an aft translatable cowl and an engine case disposed inside the engine nacelle such that an airflow duct is formed between the engine nacelle and the engine case. The translatable cowl can translate from a stowed position to a deployed position, uncovering a gap between the translatable cowl and the nacelle. A cascade vane set is positioned in the gap, a portion of which is covered by a blocker door when the translatable cowl is in the stowed position. The blocker door moves to block a portion of the airflow duct when the translatable cowl is in the deployed position. A geometrically shaped drag link is pivotally connected to the engine case at a first end and connected to the blocker door at a second end. The blocker door and shaped drag link move with the translatable cowl. When the geometrically shaped drag link and blocker door are in the deployed position, the shape of the drag link provides clearance from the engine case.

In another aspect of the invention, an aircraft turbofan engine includes an engine nacelle with an aft translatable cowl and an engine core disposed inside the engine nacelle such that an airflow duct is formed between the engine nacelle and the engine core. A fan disposed at a forward portion of the engine nacelle can produce a flow of air through the airflow duct. A protrusion such as an airflow scoop for an air/oil cooler is positioned within the airflow duct. An actuator is able to extend the translatable cowl from a stowed position to a deployed position, uncovering a gap between the translatable cowl and the nacelle. A cascade vane set is positioned in the gap, a portion of which is covered by a blocker door when the translatable cowl is in the stowed position, thereby allowing a flow of air to travel through the airflow duct. The blocker door moves to block a portion of the flow of air through the airflow duct and divert the flow of air through the cascade vane set when the translatable cowl is in the deployed position. A geometrically shaped drag link is pivotally connected to the engine core at a first end and connected to the blocker door at a second end. The blocker door and shaped drag link move with the translatable cowl. When the geometrically shaped drag link and blocker door are in the deployed position, the shape of the drag link provides clearance to avoid contacting the protrusion positioned within the airflow duct.

In yet another aspect of the invention, a blocker door assembly comprises a geometrically shaped drag link with a first end and a second end. The first end of the geometrically shaped drag link is connected to a blocker door, while the second end of the drag link is pivotally connected to a boss. The geometrically shaped drag link may be connected to the blocker door by inserting the first end through a slot in the blocker door and securing the first end with a pin or bolt that goes through a hole in the first end of the geometrically shaped drag link.

DETAILED DESCRIPTION

Figure 1:
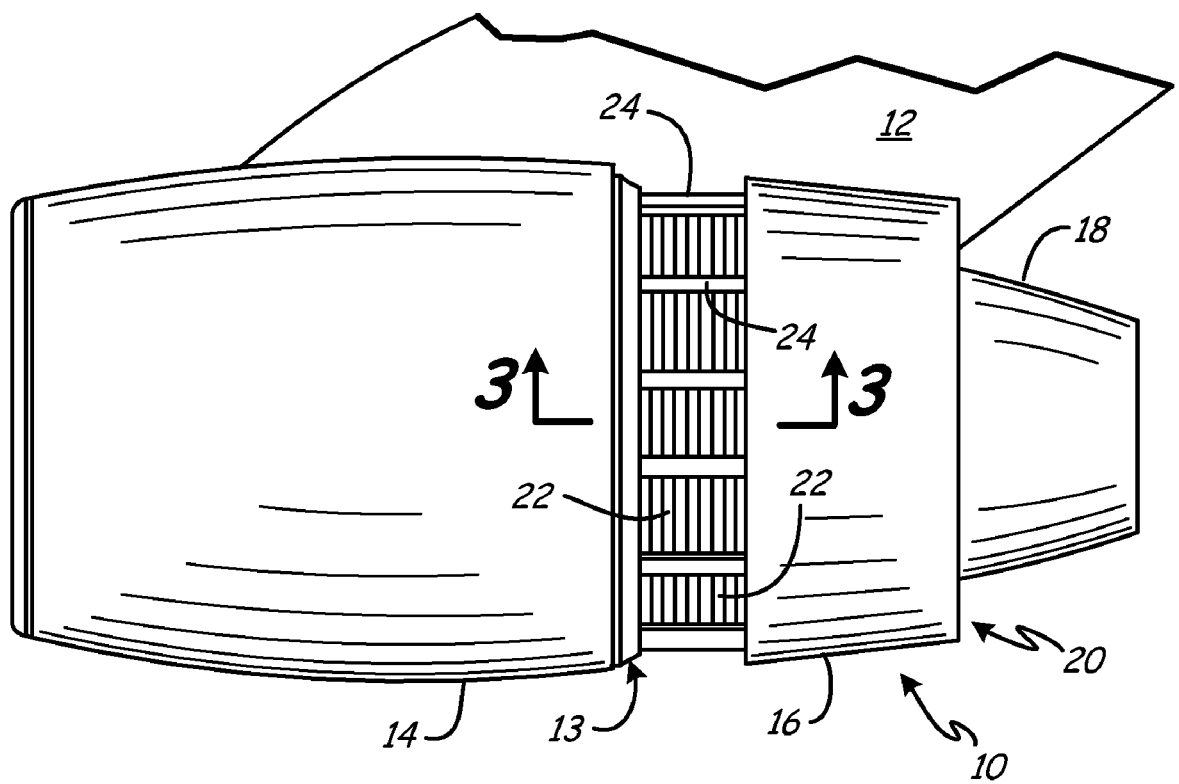
FIG. 1 is a schematic side view of a typical aircraft turbofan engine cowl using a thrust reverser system.

FIG. 1 shows turbofan engine 10 that is mounted onto an aircraft by pylon 12. Engine 10 includes segmented cowl 13 which includes nacelle body 14 and translating cowl 16 and engine core 18. Duct 20 is formed between nacelle body 14 and core 18 for fan air flow. Translating cowl 16 is split from nacelle body 14 and translates rearwardly to produce reverse thrust.

With cowl 16 translated aft as seen in FIG. 1, a plurality of cascade vane sets 22 are uncovered. Each of cascade vane sets 22 includes a plurality of conventional transverse, curved, turning vanes which turn airflow passing out from duct 20 through the cascade sets in an outwardly and forwardly direction relative to engine 10. Islands 24 are provided between cascade vane sets 22 to support the translation of cowl 16 and support the sides of cascade vane sets 22. In the stowed position, cowl 16 is translated forwardly to cover cascade vane sets 22 and provide a smooth, streamlined surface for air flow during normal flight operations.

Figure 2:
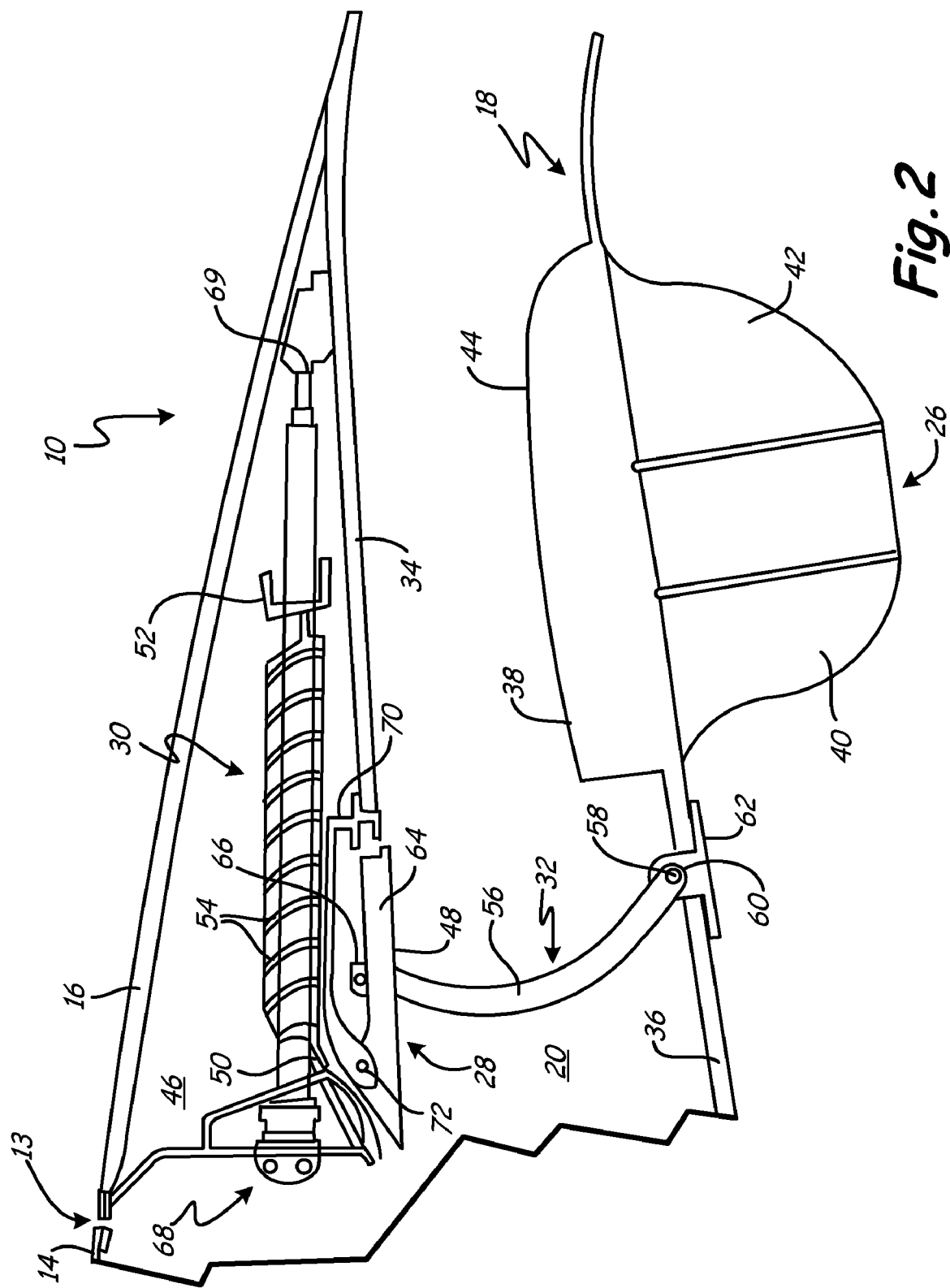
FIG. 2 is a fragmentary, sectional view taken along line 3-3 in FIG. 1 showing a blocker door incorporating a curved drag link, illustrated in the stowed position.

FIG. 2 shows a portion of an inner view of engine 10 which includes segmented cowl 13, engine core 18, duct 20, air/oil cooler 26, blocker door 28, cascade 30, and linkage assembly 32. Engine core 18 is circumscribed by segmented cowl 13. Segmented cowl 13 includes nacelle body 14 and translating cowl 16 capable of rearward translation along the longitudinal axis of engine 10. Disposed internally of segmented cowl 13 is translating sleeve 34 slaved for movement with translating cowl 16. Lying yet closer to the engine centerline is inner fixed structure (IFS) 36. IFS 36 is an outer surface of engine core 18. Duct 20 lies between translating sleeve 34 and IFS 36 and through which engine air is forced by a fan (not shown) for the operation of the engine.

In this particular portion of engine 10 shown in FIG. 2, air/oil cooler (AOC) 26 is comprised of airflow scoop 38, intake duct 40, exhaust duct 42 and aero faring surface 44. AOC 26 is disposed within IFS 36 to pull airflow out of duct 20 with its airflow scoop 38. The airflow travels through AOC intake duct 40 into AOC 26 where the relatively cool air from duct 20 is able to cool engine oil in a fluid heat exchange before it reenters duct 20 through AOC exhaust duct 42. Scoop 38 has aero faring surface 44 to minimize the drag that it produces in duct 20. As turbofan engines become more complex, sophisticated, and axially shorter, it becomes more common to have protrusions such as scoop 38 of AOC 26 extending from IFS 36 into duct 20. Other types of devices that may protrude into duct 20 include heat exchangers such as precoolers, and deicers, as they, too, may utilize scoops to pull airflow from duct 20. The considerations that go into packaging a modern turbofan engine with accessories such as heat exchangers often make it impractical or inefficient to build turbofan engines without these sorts of protrusions into duct 20, therefore it is important to note that very seldom are modern turbofan engines equipped with perfectly smooth fan ducts 20.

Figure 4:
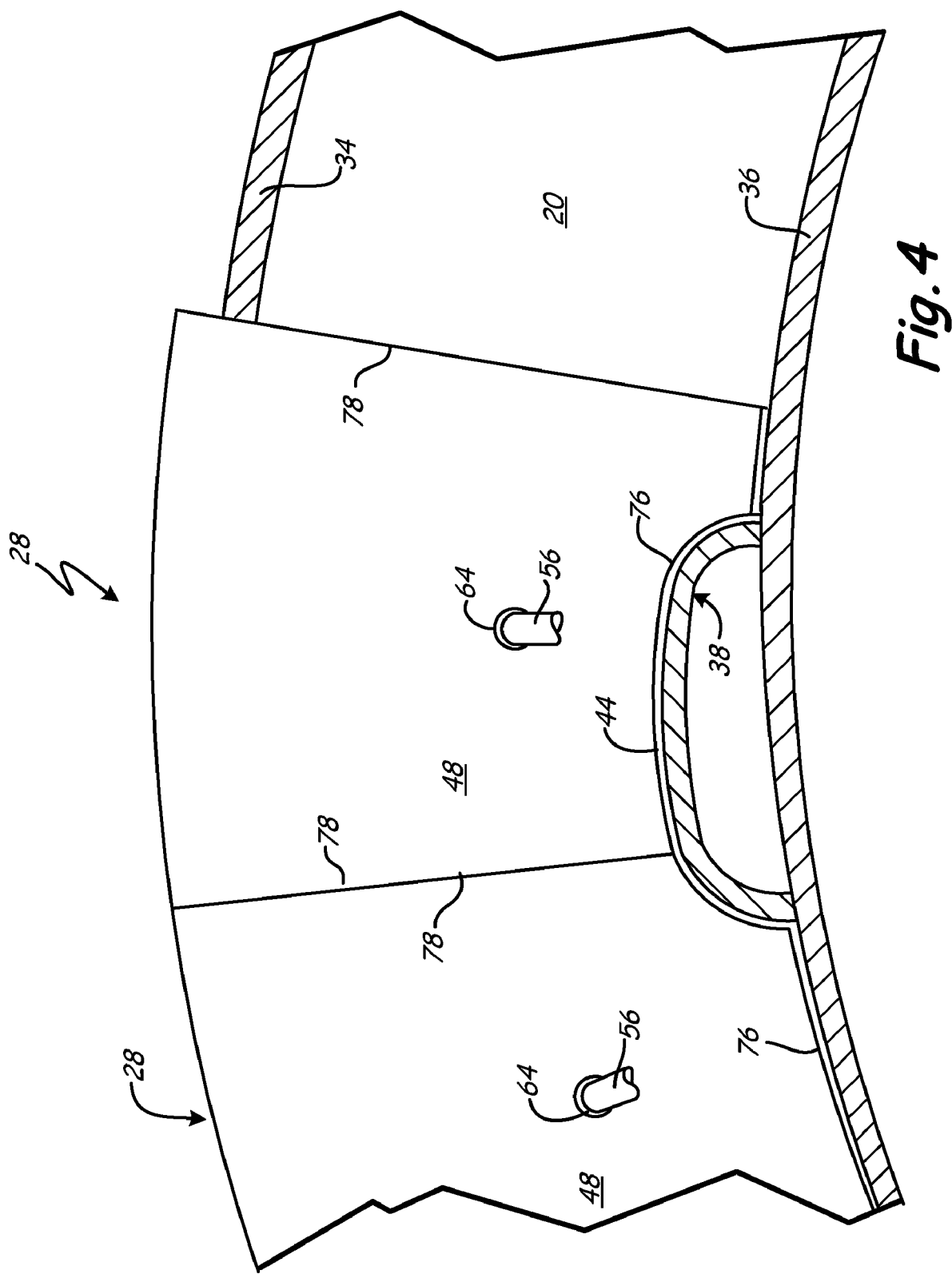
FIG. 4 is view taken along line 4-4 in FIG. 3 showing two blocker doors deployed in a thrust-reversing configuration.

Annular bypass duct 46 is disposed circumferentially adjacent and radially outward of duct 20, defined between translating cowl 16 and translating sleeve 34. In the normal or cruise mode shown in FIG. 2, blocker door 28 lies generally contiguous with the surface of translating sleeve 34 and functions as a continuous extension thereof defining a forward zone of duct 20. Forward face 48 of blocker door 28 thus constitutes an aerodynamic surface within engine 10. Door 28 is configured to mate and cooperate with a plurality of like doors; a typical door has a general form of an arcuate wedge segment of a circle with a radius corresponding generally to the radius of curvature of translating sleeve 34. When door 28 is associated with a plurality of like doors disposed with side edges in mating engagement, an annular ring is formed as shown in FIG. 4.

Cascade 30 is disposed within bypass duct 46 secured by forward and aft brackets 50 and 52 respectively. Cascade 30 includes a plurality of vanes 54 curved with a forward aspect to divert air in that direction through duct 46. In the cruise mode shown in FIG. 2, cascade 30 is surrounded by blocker door 28 and translating cowl 16. Therefore, as airflow passes through duct 20, blocker door 28 and its forward face 48 prevent airflow from passing through bypass duct 46 and cascade 30. Linkage assembly 32, responsible for control in the deployment of blocker door 28, includes drag link 56 which is pinned or otherwise secured for rotation around its proximal end. In the embodiment shown, this is achieved by securing drag link 56 by pin 58 to boss 60 secured to IFS 36 by flange 62. Both drag link 56 and boss 60 are provided with suitable bushings or bearings within this pin joint for improved dynamic performance. The distal end of drag link 56 is inserted through slot 64 in blocker door 28 and is secured with pin 66. Any other means of securing drag link 56 to blocker door 28 can also be used, such as a bolt for example.

Cascade 30 shown in FIG. 2 is just one of many cascade vane sets 22 disposed circumferentially around engine 10 as shown in FIG. 1. Actuator 68 is disposed between these sets of cascades in order to drive cowl 16 and translating sleeve 34 rearward by means of connection 69 on translating sleeve 34. After a thrust reversing operation is completed, actuators 68 return blocker door 28 to the stowed position. Actuator 68 can be a ball-screw actuator, hydraulic actuator, or any other actuator known in the art. In one embodiment, multiple actuators 68 are spaced around engine 10 in between cascade vane sets 22.

Blocker door 28 is engaged with translating sleeve 34 through bracket means 70. Pivot 72 is a hinge attachment between blocker door 28 and bracket means 72. In an alternative embodiment, blocker door 28 can be engaged directly to translating sleeve 34 through a hinge attachment. Pivot 72 allows blocker door 28 to rotate as cowl 16 and translating sleeve 34 move from a stowed position to a deployed position.

With the increased fan duct dimensions currently employed in the state-of-the-art designs for turbofan engines, as well as with the potential protrusions in the duct 20, blocker door 28 must be deployed over large radial distances. Moreover, door 28 and linkage assembly 32 must be able to avoid interfering with other components and protrusions within duct 20 and engine 10 in order to effectively play a part in producing reverse thrust.

Figure 3:
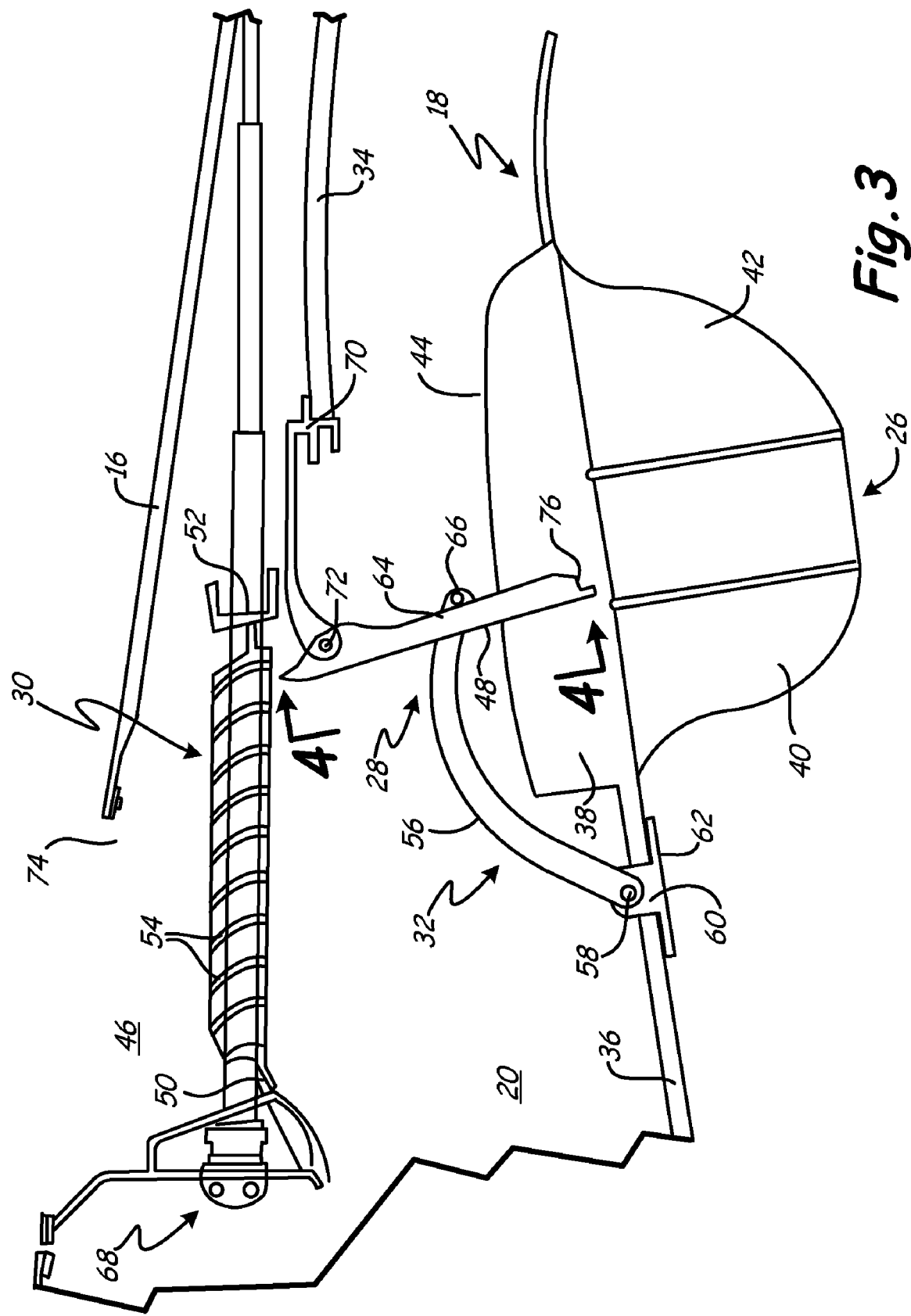
FIG. 3 is a view similar to FIG. 2, showing the blocker door and curved drag link in a deployed thrust-reversing configuration.

FIG. 3 shows engine 10 in a reverse thrust mode. Blocker door 28 and its associated linkage system 32 are responsive to translation of cowl 16 and translating sleeve 34 during a thrust reversing sequence. As noted above, FIG. 2 shows a normal or cruise mode where fan air is directed through duct 20. When in reverse thrust mode or deployed position, shown in FIG. 3, duct 20 is blocked by a ring of blocker doors 28, interposed within duct 20 and collectively having a complementary geometric configuration with respect thereto, for diversion of fan air into bypass duct 46. The reverse thrust mode is achieved by aft or rearward movement of cowl 16 and translating sleeve 34 by actuator 68 such as a ball-screw actuator, thereby exposing outlet port 74 for airflow to escape through after the air passes into bypass duct 46. Concomitantly, blocker doors 28 are translated aft due to attachment with bracket means 72 borne on sleeve 34. Pivot 72 is a hinge attachment between blocker door 28 and bracket means 70. Alternatively, blocker door 28 can be directly hinged to translating sleeve 34. As actuator 68 drives cowl 16 and translating sleeve 34 rearward into the deployed position, blocker door 28 is pivoted downwardly into duct 20. Air that formerly passed through duct 20 now strikes face 48 of door 28 and is diverted radially outwardly, through cascade 30 which, by virtue of the forward aspect on vanes 56, directs the flow forwardly and out through outlet port 68 to achieve reverse thrust. Blocker door 28 has trailing edge 76 that is configured to fit over or mate with scoop 38 when engine 10 is in reverse thrust mode. A clearer illustration of the relationship between trailing edge 76, IFS 36, and scoop 38 can been seen in FIG. 4.

Drag link 56 is shaped or contoured in such a way that when blocker door 28 moves from the stowed position shown in FIG. 2 to the deployed position in FIG. 3, it does not interfere with scoop 38 of AOC 26. In other words, drag link 56 can be fashioned so that it has a clearance with respect to IFS 36 due to the shaping of drag link 56 when blocker door 28 is in the deployed position. Further, it is possible to fashion drag link 56 so that it has a clearance with respect to scoop 38 while it is in the deployed position, and it is also possible to fashion drag link 56 so that it rests on scoop 38 while it is in the deployed position. Blocker door 28 is fashioned to fit tightly over aero faring surface 44 of scoop 38 such that when it joins the plurality of blocker doors to form an annular ring, duct 20 is still substantially blocked, forcing the air through cascade 30 and bypass duct 46.

There are a number of possible geometric shapes into which drag link 56 can be fashioned. Drag link 56 can be fashioned into a smooth curve, it can be bent, or it can have multiple bends. A drag link 56 that is shaped into a smooth curve is an especially desirable embodiment because it can result in a decrease in air drag through duct 20 during cruise mode.

FIG. 4 is a front view of two blocker doors 28 in a deployed position. Blocker doors 28 have tapered side edges 78 to mate with each other to form an annular ring. This annular ring makes a wall of blocker door forward faces 48 that deflect the airflow through duct 20 through cascades 30. In FIG. 4, only two blocker doors 28 are shown forming part of the annular ring so as to show translating sleeve 34 to which they are engaged, either by bracket means 70 and pivot 72, or another attachment hinged directly to translating sleeve 34 (not illustrated in FIG. 4). Blocker doors 28 also have trailing edges 76 configured to mate with IFS 36 and scoop 38. Blocker doors that do not line up with scoop 38 can have trailing edges 76 configured to mate with only IFS 36.

Although the present invention has been described with reference to preferred embodiments, workers skilled in the art will recognize that changes may be made in form and detail without departing from the scope of the invention. The implementations described above and other implementations are within the scope of the following claims.

The invention claimed is:

1. A thrust reverser blocker door assembly comprising:
    a translating cowl forming an aft portion of an engine nacelle;
    a translating sleeve slaved for movement with the translating cowl and disposed internally thereto, wherein both the translating cowl and the translating sleeve are able to translate from a stowed position to a deployed position uncovering a gap between the translating cowl and the nacelle;
    an engine case within the nacelle forming an airflow duct between the translating cowl and engine case;
    a cascade vane set positioned in the gap;
    a blocker door that covers the cascade vane set when the translating cowl is in the stowed position and blocks a portion of the airflow duct when the translating cowl is in the deployed position; and
    a geometrically shaped drag link that is pivotally connected to the engine case at a first end and connected to the blocker door at a second end, the geometrically shaped drag link moving with the translating cowl.

2. The thrust reverser blocker door assembly of claim 1 wherein the geometrically shaped drag link provides clearance from the engine case when the translating cowl is in the deployed position.

3. The thrust reverser blocker door assembly of claim 2 further comprising a protrusion disposed within the airflow duct.

4. The thrust reverser blocker door assembly of claim 3 wherein the geometrically shaped drag link has enough clearance to avoid coming into contact with the protrusion when the translating cowl is in the deployed position.

5. The thrust reverser blocker door assembly of claim 1 further comprising an actuator for extending the translating cowl aft from the stowed position to the deployed position.

6. The thrust reverser blocker door assembly of claim 1 wherein the geometrically shaped drag link is a curved drag link.

7. A thrust reverser blocker door assembly comprising:
    a translating cowl forming an aft portion of an engine nacelle, wherein the translating cowl able to translate from a stowed position to a deployed position uncovering a gap between the translating cowl and the nacelle;
    an engine case within the nacelle forming an airflow duct between the translating cowl and engine case;
    a cascade vane set positioned in the gap;
    a blocker door that covers the cascade vane set when the translating cowl is in the stowed position and blocks a portion of the airflow duct when the translating cowl is in the deployed position;
    a protrusion disposed within the airflow duct, wherein the protrusion comprises a faring extending from the engine case; and
    a geometrically shaped drag link that is pivotally connected to the engine case at a first end and connected to the blocker door at a second end, the geometrically shaped drag link moving with the translating cowl, wherein the geometrically shaped drag link is contoured to rest on the protrusion when the translating cowl is in the deployed position.

8. A thrust reverser blocker door assembly comprising:
    a translating cowl forming an aft portion of an engine nacelle, wherein the translating cowl able to translate from a stowed position to a deployed position uncovering a gap between the translating cowl and the nacelle;
    an engine case within the nacelle forming an airflow duct between the translating cowl and engine case;
    a cascade vane set positioned in the gap;
    a blocker door that covers the cascade vane set when the translating cowl is in the stowed position and blocks a portion of the airflow duct when the translating cowl is in the deployed position;
    a protrusion disposed within the airflow duct, wherein the protrusion comprises a faring extending from the engine case; and
    a geometrically shaped drag link that is pivotally connected to the engine case at a first end and connected to the blocker door at a second end, the geometrically shaped drag link moving with the translating cowl, wherein the geometrically shaped drag link provides clearance from the engine case when the translating cowl is in the deployed position.

9. The thrust reverser blocker door assembly of claim 8 wherein the protrusion is a scoop for an air/oil cooler.

10. The thrust reverser blocker door assembly of claim 8 wherein the protrusion is a scoop for an aircraft deicer.

11. The thrust reverser blocker door assembly of claim 8 wherein the protrusion is a scoop for a heat exchanger.

12. An aircraft turbofan engine comprising:
    an engine nacelle;
    a translating cowl forming an aft portion of the engine nacelle;
    an engine core within the nacelle forming an airflow duct between the translating cowl and engine core;
    a fan disposed at a forward portion of the engine nacelle for producing a flow of air in the airflow ducts;
    an actuator for extending the translating cowl aft from a stowed position to a deployed position uncovering a gap between the translating cowl and nacelle;

a plurality of cascade vanes positioned in the gap;

a blocker door that covers the plurality of cascade vanes when the translating cowl is in the stowed position such that the flow of air travels through the airflow duct and blocks a portion of the airflow duct when the translating cowl is in the deployed position such that the flow of air travels through the plurality of cascade vanes;

a protrusion into the airflow duct; and a geometrically shaped drag link that is pivotally connected to the engine core at a first end and connected to the blocker door at a second end, the geometrically shaped drag link moving with the translating cowl and avoiding contact with the protrusion when the translating cowl is in the deployed position.

13. The thrust reverser blocker door assembly of claim 12 wherein the geometrically shaped drag link is a curved drag link.

14. The thrust reverser blocker door assembly of claim 13 wherein the protrusion is a scoop for an air/oil cooler.

15. The thrust reverser blocker door assembly of claim 13 wherein the protrusion is a scoop for an aircraft deicer.

16. The thrust reverser blocker door assembly of claim 13 wherein the protrusion is a scoop for a heat exchanger.

17. A blocker door assembly for use in a thrust reverser of a turbofan engine comprising:

a blocker door with a leading end configured to engage with a translating sleeve and a trailing end configured to mate with a protrusion of an inner fixed structure of an engine core to deflect airflow in a duct defined by the space between the translating sleeve and the fixed structure; and a geometrically shaped drag link including a first end connected to the thrust reverser blocker door and a second end pivotally connected to a boss.

18. The blocker door assembly of claim 17 wherein the geometrically shaped drag link is a curved drag link configured to provide clearance from the protrusion.

19. The blocker door assembly of claim 17 wherein the first end of the geometrically shaped drag link is connected to the blocker door by inserting the first end through a slot in the blocker door and securing the first end with a pin or bolt that goes through a hole in the first end.

20. The blocker door assembly of claim 19 wherein the boss is configured to be fixed to the inner fixed structure by a flange.

* * * * *